(12) United States Patent
Murata et al.

(10) Patent No.: US 8,152,665 B2
(45) Date of Patent: Apr. 10, 2012

(54) PULLEY STRUCTURE AND BELT-TYPE CONTINUOUSLY VARIABLE TRANSMISSION

(75) Inventors: Youichi Murata, Kariya (JP); Kazumichi Tsukuda, Anjo (JP); Naoki Ohkoshi, Anjo (JP); Katsumori Fujii, Anjo (JP); Daisuke Kikukawa, Toyota (JP)

(73) Assignees: Aisin Aw Co., Ltd, Aichi-Ken (JP); Toyota Jidosha Kabushiki Kaisha, Aichi-Ken (JP)

( * ) Notice: Subject to any disclaimer, the term of this patent is extended or adjusted under 35 U.S.C. 154(b) by 494 days.

(21) Appl. No.: 12/388,737

(22) Filed: Feb. 19, 2009

(65) Prior Publication Data

US 2009/0221389 A1    Sep. 3, 2009

(30) Foreign Application Priority Data

Feb. 28, 2008    (JP) ................. 2008-047654

(51) Int. Cl.
  *F16H 55/56*    (2006.01)
  *F16H 9/12*    (2006.01)
(52) U.S. Cl. .......................................... 474/8
(58) Field of Classification Search ............ 474/8–28
  See application file for complete search history.

(56) References Cited

U.S. PATENT DOCUMENTS

| 6,379,275 B1 * | 4/2002 | Serkh .............................. 474/49 |
| 2004/0248678 A1 | 12/2004 | Kappaan et al. |
| 2005/0233844 A1 | 10/2005 | Kuroda |
| 2005/0239585 A1 | 10/2005 | Nishida et al. |

FOREIGN PATENT DOCUMENTS

| DE | 8221745 U1 | 9/1990 |
| JP | 2005-291317 A | 10/2005 |
| JP | 2005-315270 A | 11/2005 |
| JP | 2007-040325 A | 2/2007 |
| JP | 2007-309369 A | 11/2007 |
| WO | 03/036134 A1 | 5/2003 |

OTHER PUBLICATIONS

Translation of Chinese Office Action dated Nov. 23, 2011, issued in corresponding Chinese Patent Application No. 200980100890.0.
Translation of German Office Action dated Dec. 19, 2011, issued in corresponding German Patent Application No. 10 2009 000 032.0.

* cited by examiner

*Primary Examiner* — William E Dondero
(74) *Attorney, Agent, or Firm* — Sughrue Mion, PLLC

(57) ABSTRACT

A fixed sheave mounted on an input shaft and a movable sheave mounted on a cylindrical member that is slidably supported in the axial direction relative to the input shaft are respectively structured using annular members having the same shape. With this structure, the fixed sheave and the movable sheave can be common structural components, thereby enabling the structural components to be easily formed by making the shape thereof relatively simple. As a result, productivity can be further improved.

8 Claims, 4 Drawing Sheets

F I G . 1
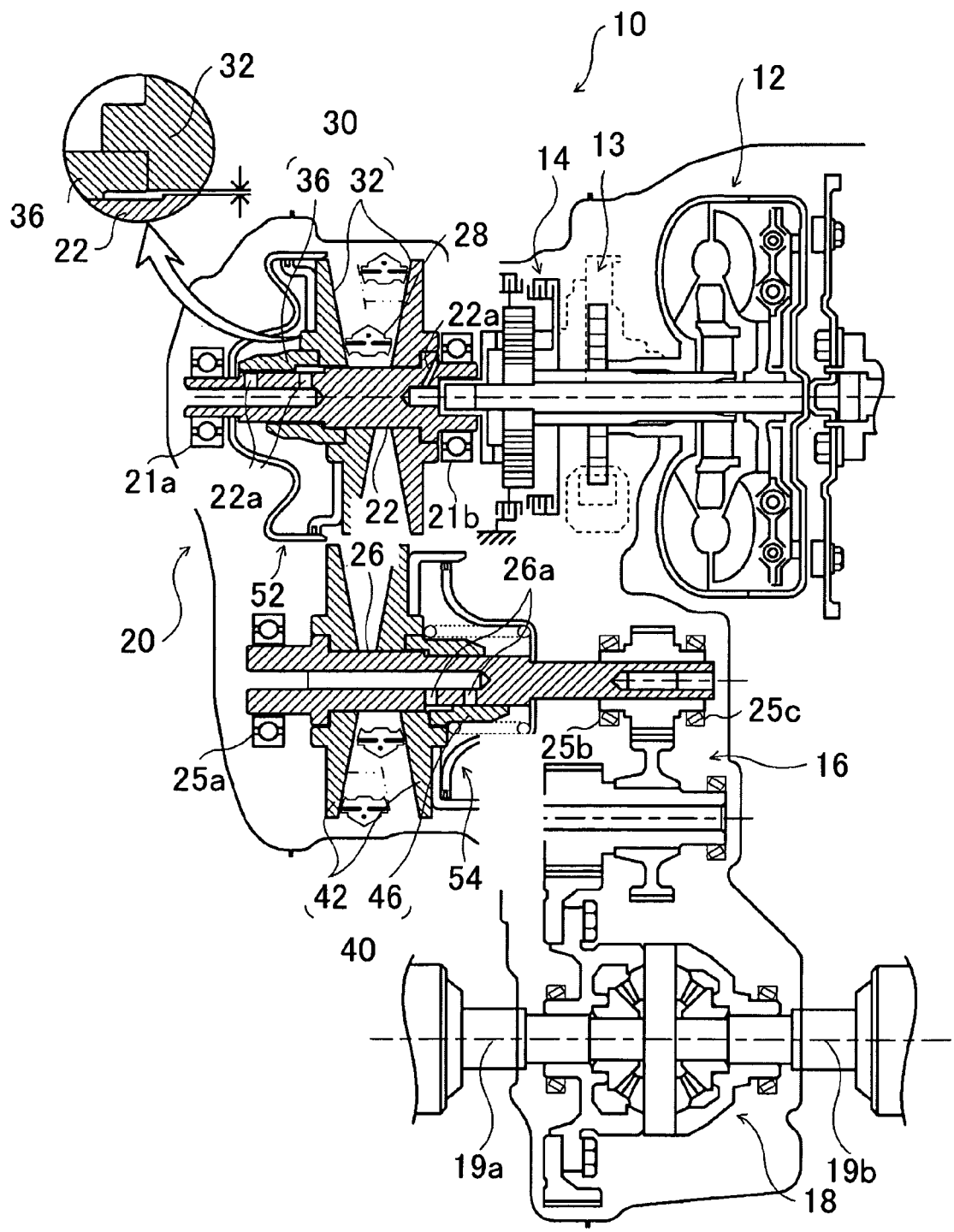

PULLEY STRUCTURE AND BELT-TYPE CONTINUOUSLY VARIABLE TRANSMISSION

INCORPORATION BY REFERENCE

The disclosure of Japanese Patent Application No. 2008-047654 filed on Feb. 28, 2008, including the specification, drawings and abstract is incorporated herein by reference in its entirety.

BACKGROUND OF THE INVENTION

1. Field of the Invention

The present invention relates to a pulley structure for a pulley used in a belt-type continuously variable transmission, and also to a belt-type continuously variable transmission equipped with the pulley that uses the pulley structure.

2. Description of the Related Art

In related art, as this type of pulley structure, there has been proposed a structure used for a pulley mounted in a belt-type continuously variable transmission, in which a fixed sheave integrally formed with a shaft portion and a movable sheave also integrally formed with a shaft portion are arranged to face each other (refer, for example, to Japanese Patent Application Publication No. JP-A-2005-291317). In this pulley structure, the shaft portion of the movable sheave is made to be hollow to be inserted in an axially slidable manner to the shaft portion of the fixed sheave, and the space between the sheaves is widened and narrowed by using hydraulic pressure from a hydraulic pressure chamber provided on a back face of the movable sheave.

Because a pulley used in a continuously variable transmission such as described above is required to have a comparatively high processing accuracy, it is desirable to make components thereof as simplified and common as possible for further improving productivity of the pulley.

SUMMARY OF THE INVENTION

It is an object of the present invention to provide a pulley structure and a belt-type continuously variable transmission in which the pulley includes common structural components.

In order to achieve the object described above, a pulley structure and a belt-type continuously variable transmission according to the present invention can employ the following structure.

According to a first aspect of the present invention, there is provided a pulley structure for a pulley used in a belt-type continuously variable transmission. In the pulley structure, a first annular member having a sheave surface is mounted on a first shaft that is formed as an input shaft and/or an output shaft of the continuously variable transmission, and a second annular member having the same shape as that of the first annular member is mounted on a second shaft that is slidable in the axial direction relative to the first shaft, the annular members mounted on the first and second shafts being assembled as the pulley.

In the pulley structure according to the first aspect of the present invention, the first annular member having a sheave surface is mounted on the first shaft, then the second annular member having the same shape as that of the first annular member is mounted on the second shaft, and further the annular members mounted on the first and second shafts are assembled as the pulley. With this structure, the annular members can be common structural components. In addition, each member composing the pulley can be formed into a relatively simple shape, thereby enabling to form the member relatively easily. Consequently, productivity can be further improved.

The pulley structure according to the first aspect of the present invention can also be a structure in which a through hole through which the first shaft can penetrate is formed in each of the annular members, and a step portion that has an inner circumferential surface with a diameter larger than a diameter of an inner circumferential surface of the through hole and substantially the same as a diameter of an outer circumferential surface of the second shaft is formed on a back surface side of the sheave surface of the each of the annular members; the second shaft is a hollow cylindrical member into which the first shaft can be inserted, and a cylindrical end surface and a cylindrical outer circumferential surface of the cylindrical member are fit into the step portion of the second annular member; and a flange portion having a diameter substantially the same as the diameter of the cylindrical outer circumferential surface of the second shaft is formed on an outer circumferential surface of the first shaft, and an outer circumferential surface and a side surface of the flange portion are fit into the step portion of the first annular member. With this structure, the annular members can be mounted more easily, and also the mounting strength thereof can be ensured. The pulley structure according to the above-described aspect of the present invention can also be a structure in which the annular members are formed so that a predetermined clearance is provided between the inner circumferential surface of the through hole of the respective annular member and the outer circumferential surface of the first shaft, after the first shaft has been inserted into a hollow portion of the second shaft on which the annular member is mounted. With this structure, the movable sheave can move smoothly.

Further, the pulley structure according to the present invention can be a structure in which the respective annular member is mounted on the respective shaft by using a spline coupling. With this structure, the annular members can be mounted more easily.

According to another aspect of the present invention, there is provided a belt-type continuously variable transmission that includes a pulley using the pulley structure of the above-described aspects of the present invention. Consequently, the same effects as the effects exerted by the pulley structure of the above-described aspects of the present invention can be exerted, such as, for example, the effect that the annular members can be common structural components, the effect that each member composing the pulley can be formed into a relatively simple shape, and the effect that productivity can be further improved.

BRIEF DESCRIPTION OF THE DRAWINGS

FIG. 1 is a structural diagram showing an outline of a structure of a power transmission apparatus 10 incorporating a continuously variable transmission 20 as an embodiment of the present invention;

FIG. 2 is an external diagram showing an outside appearance of an annular member 32 viewed from the side of a sheave surface 32a;

FIG. 3 is an external diagram showing an outside appearance of the annular member 32 viewed from the side of a back surface 32b of the sheave surface 32a;

DETAILED DESCRIPTION OF THE EXEMPLARY EMBODIMENTS

Figure 2:
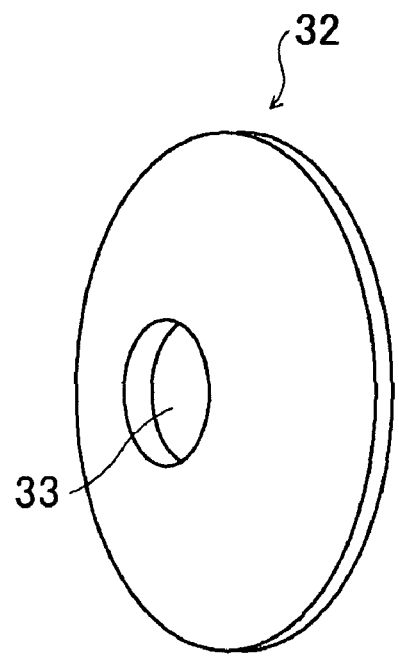

A preferred embodiment of the present invention will be described below using an exemplary embodiment.

FIG. 1 is a structural diagram showing an outline of a structure of a power transmission apparatus 10 incorporating a continuously variable transmission 20 as an embodiment of the present invention. The power transmission apparatus 10 is structured so as to transmit power from an engine (not shown) mounted on a vehicle to axles 19a and 19b of left and right wheels. As shown in FIG. 1, the apparatus 10 is provided with a torque converter 12 with a lock-up mechanism connected to an output shaft of the engine, a forward/reverse changeover unit 14 that switches the direction of rotation of an output shaft of the torque converter 12 between forward direction and reverse direction, and the continuously variable transmission 20. The continuously variable transmission 20 is connected to an input shaft 22 serving as an output shaft of the forward/reverse changeover unit 14 and to an output shaft 26 coupled to the axles 19a and 19b through a differential gear 18 and a gear mechanism 16 so as to steplessly change the speed of the power from the input shaft 22 and then output the power to the output shaft 26. An oil pump 13 pressure-feeds hydraulic oil stored in an oil pan (not shown) by using the power from the engine and is arranged between the torque converter 12 and the forward/reverse changeover unit 14.

As shown in FIG. 1, in the continuously variable transmission 20 of the embodiment, the input shaft 22 is rotatably supported at both ends thereof by bearings 21a and 21b, a primary pulley 30 of variable groove width is connected to the input shaft 22, the output shaft 26 is rotatably supported at both ends thereof by bearings 25a, 25b, and 25c, a secondary pulley 40 of variable groove width is connected to the output shaft 26 serving as a drive shaft, a belt 28 is bridged between grooves of the primary pulley 30 and the secondary pulley 40, a hydraulic cylinder 52 is provided for changing the groove width of the primary pulley 30, a hydraulic cylinder 54 is provided for changing the groove width of the secondary pulley 40, and a hydraulic pressure from an oil pump 13 is used to drive the hydraulic cylinders 52 and 54, thereby changing the groove widths of the primary pulley 30 and the secondary pulley 40. Thus, the speed of the power from the input shaft 22 is steplessly changed, and the speed-changed power is output to the output shaft 26. The input shaft 22 and the output shaft 26 are formed with through holes 22a and 26a, respectively, for supplying the hydraulic oil pressure-fed by the oil pump 13 to the bearings 21a, 21b, 25a, 25b, and 25c, and other mechanical parts.

Figure 3:
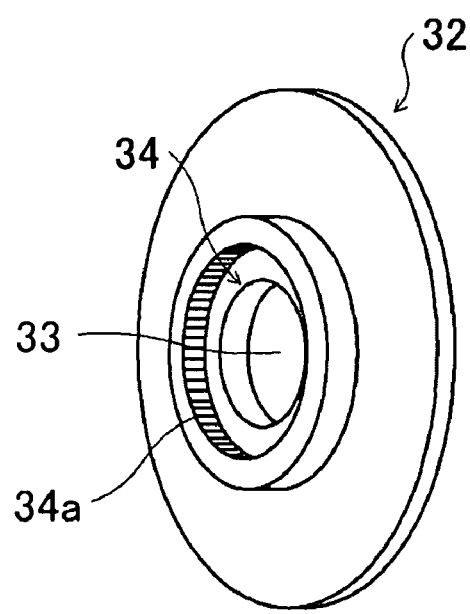

The primary pulley 30 is composed of a fixed sheave mounted on the input shaft 22, a cylindrical member 36 slidably supported in the axial direction by the input shaft 22 through a ball spline or the like, and a movable sheave mounted on the cylindrical member 36. The fixed sheave and the movable sheave are formed as annular members 32 having the same shape. FIG. 2 shows an external diagram of the annular member 32 viewed from a sheave surface side, and FIG. 3 shows an external diagram of the annular member 32 viewed from a back surface side of the sheave surface. As shown in FIG. 2 an FIG. 3, a through hole 33 through which the input shaft 22 can penetrate is formed in the center of the annular member 32, and a step portion 34 that has an inner circumferential surface with a diameter larger than the diameter of the inner circumferential surface of the through hole 33 is formed on the back surface side of the sheave surface. A spline 34a is formed in the axial direction on the inner circumferential surface of the step portion 34 so as to mount the annular member 32 on the input shaft 22 or the cylindrical member 36.

Figure 4:
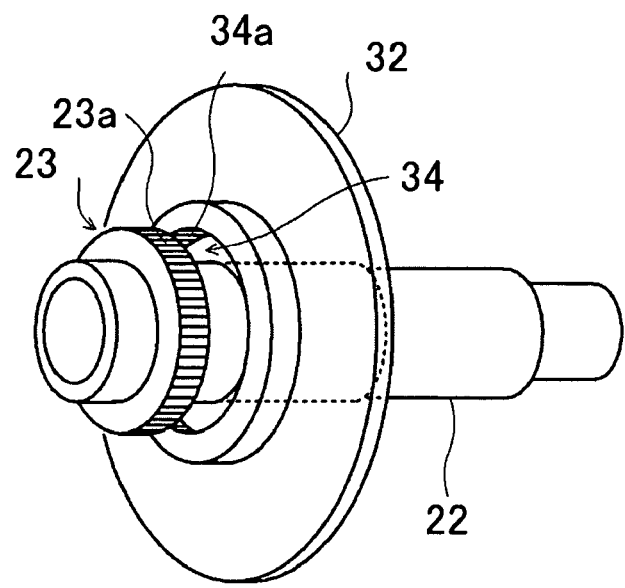
FIG. 4 is an explanatory diagram showing how the annular member 32 serving as a fixed sheave is mounted on an input shaft 22.

FIG. 4 is an explanatory diagram showing how the annular member 32 serving as the fixed sheave is mounted on the input shaft 22. As described above, the step portion 34 that has the inner circumferential surface with a diameter larger than the diameter of the inner circumferential surface of the through hole 33 through which the input shaft 22 can penetrate is formed in the annular member 32, and the spline 34a is formed in the axial direction on the inner circumferential surface of the step portion 34. As shown in FIG. 4, a flange portion 23 that has an outer circumferential surface with a diameter substantially the same as the diameter of the inner circumferential surface of the step portion 34 of the annular member 32 is formed on the outer circumference of the input shaft 22 at a location slightly closer to the middle thereof than from a shaft end thereof, and a spline 23a is formed in the axial direction on the outer circumferential surface of the flange portion 23. Therefore, the annular member 32 can be mounted on the input shaft 22 by fitting the flange portion 23 of the input shaft 22 into the step portion 34 of the annular member 32 to provide a spline coupling between the outer circumferential surface of the flange portion 23 and the inner circumferential surface of the step portion 34.

Figure 5:
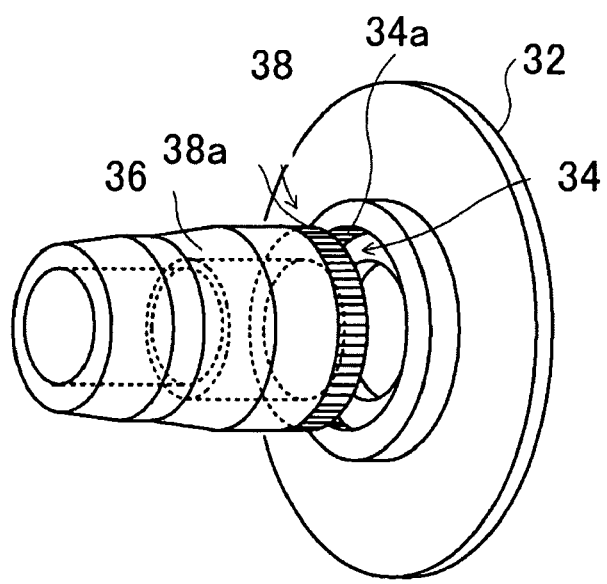
FIG. 5 is an explanatory diagram showing how the annular member 32 serving as a movable sheave is mounted on a cylindrical member 36.

FIG. 5 is an explanatory diagram showing how the annular member 32 serving as the movable sheave is mounted on the cylindrical member 36. As shown in the diagram, the cylindrical member 36 is formed so as to have a shaft end 38 with an outside diameter substantially the same as the diameter of the inner circumferential surface of the step portion 34 of the annular member 32, and a spline 38a is formed in the axial direction on the outer circumferential surface of the shaft end 38. Therefore, the annular member 32 can be mounted on the cylindrical member 36 by fitting the shaft end 38 of the cylindrical member 36 into the step portion 34 of the annular member 32 to provide a spline coupling between the outer circumferential surface of the shaft end 38 and the inner circumferential surface of the step portion 34.

Figure 6:
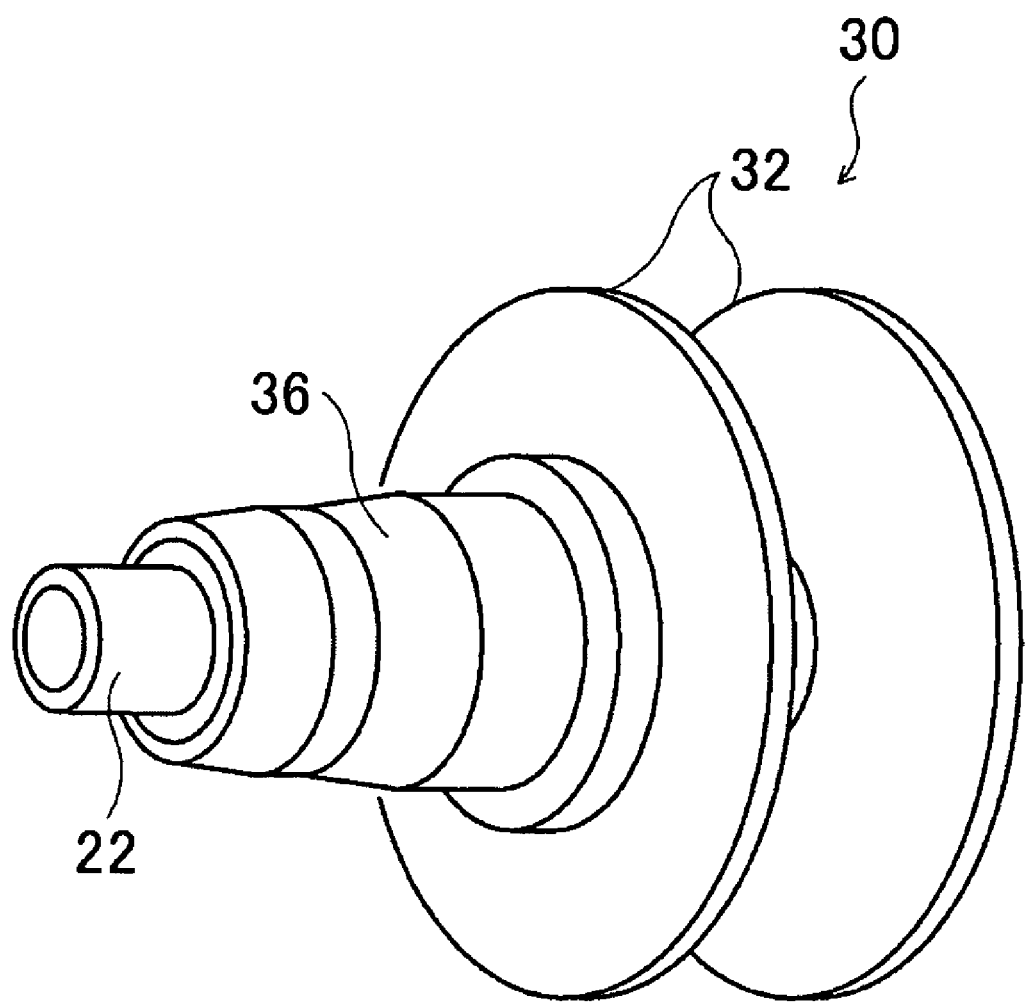
FIG. 6 is an external diagram showing an outside appearance of a primary pulley 30.

After mounting one of the annular members 32 on the input shaft 22 and the other of the annular members 32 on the cylindrical member 36 as described above, the input shaft 22 is inserted to the cylindrical member 36 so that the sheave surfaces of the both annular members 32 face each other, thereby completing the primary pulley 30 to which the input shaft 22 is connected. FIG. 6 shows an external diagram of the primary pulley 30 after completion. In the primary pulley 30, as shown in the enlarged area surrounded by a circle in FIG. 1, the diameter of the through hole 33 of the annular member 32 serving as the movable sheave is designed so that a slight clearance is provided between the inner circumferential surface of the through hole 33 and the outer circumferential surface of the input shaft 22 after the annular members 32 have been mounted on the cylindrical member 36 and the input shaft 22 and then the input shaft 22 has been inserted to the cylindrical member 36 so that the sheave surfaces of the both annular members 32 face each other, thereby enabling the annular member 32, when serving as the movable sheave, to move smoothly relative to the outer circumferential surface of the input shaft 22.

In a similar manner as the primary pulley 30, the secondary pulley 40 is also composed of a fixed sheave mounted on the output shaft 26, a cylindrical member 46 slidably supported in the axial direction by the output shaft 26 through a ball spline or the like, and a movable sheave mounted on the cylindrical member 46. The fixed sheave and the movable sheave are formed as annular members 42 that are the same as each other. As the annular members 42 used for the secondary pulley 40 and as the above-described annular members 32 used for the primary pulley 30, components of the same shape may be used, or components to which some degree of processing has been applied may be used, depending on the specification of the continuously variable transmission 20. One of the annular members 42 is mounted on the output shaft 26 in the same manner as the above-described mounting of the annular member 32 on the input shaft 22, and the other of the annular members 42 is mounted on the cylindrical member 46 in the same manner as the above-described mounting of the annular member 32 on the cylindrical member 36, thereby being assembled as the secondary pulley 40. Therefore, description of the mounting of the annular members 42 is omitted to avoid duplication of explanation.

According to the continuously variable transmission 20 of the embodiment described above, the fixed sheave mounted on the input shaft 22 and the movable sheave mounted on the cylindrical member 36 slidably supported in the axial direction relative to the input shaft 22 are structured by using the annular members 32 having the same shape, and in addition, the fixed sheave mounted on the output shaft 26 and the movable sheave mounted on the cylindrical member 46 slidably supported in the axial direction relative to the output shaft 26 are structured by using the annular members 42 having the same shape. Therefore, the fixed sheave and the movable sheave can be a common member. In addition, since the shapes of individual components can be made relatively simple, the components can be formed easily. Consequently, productivity can be further improved.

Moreover, according to the continuously variable transmission 20 of the embodiment, the diameter of the through hole 33 of the annular member 32 is designed so that a slight clearance is provided between the inner circumferential surface of the through hole 33 of the annular member 32 and the outer circumferential surface of the input shaft 22 after the annular member 32 has been mounted on the cylindrical member 36 and then the input shaft 22 has been inserted into the through hole 33 of the annular member 32 serving as the movable sheave, thereby enabling the annular member 32, when serving as the movable sheave, to move smoothly relative to the outer circumferential surface of the input shaft 22.

In the continuously variable transmission 20 of the embodiment, the fixed sheave and the movable sheave of the primary pulley 30 are structured by using the annular members 32 having the same shape, and in addition, the fixed sheave and the movable sheave of the secondary pulley 40 are structured by using the annular members 42 having the same shape. However, the fixed sheave and the movable sheave of the secondary pulley 40 may be made as members that do not have the same shape while the fixed sheave and the movable sheave of the primary pulley 30 are structured by using the annular members 32 having the same shape, or the fixed sheave and the movable sheave of the primary pulley 30 may be made as members that do not have the same shape while the fixed sheave and the movable sheave of the secondary pulley 40 are structured by using the annular members 42 having the same shape.

Although in the embodiment, the present invention in which the fixed sheave and the movable sheave are structured by using the annular members having the same shape to be assembled as the pulley has been described as the form of the continuously variable transmission 20, the present invention may take the form of a pulley structure for the pulley described above.

Although the preferred embodiment has been described above using the exemplary embodiment, it is obvious that the present invention is not limited to the embodiment described above, but can be put into practice in various forms within the scope not departing from the gist of the present invention.

The present invention can be used in industries such as the manufacturing industry of continuously variable transmissions and the automotive industry.

What is claimed is:

1. A pulley structure for a pulley used in a belt-type continuously variable transmission, comprising:
    a first annular member having a sheave surface mounted on a first shaft that is formed as an input shaft or an output shaft of the continuously variable transmission, and
    a second annular member having the same shape as that of the first annular member mounted on a second shaft that is slidable in the axial direction relative to the first shaft, the annular members mounted on the first and second shafts being assembled as the pulley; wherein
    a through hole through which the first shaft can penetrate is formed in each of the annular members, and a step portion that has an inner circumferential surface with a diameter larger than a diameter of an inner circumferential surface of the through hole and substantially the same as a diameter of an outer circumferential surface of the second shaft is formed on a back surface side of the sheave surface of the each of the annular members;
    the second shaft is a hollow cylindrical member into which the first shaft can be inserted, and a cylindrical end surface and a cylindrical outer circumferential surface of the cylindrical member are fit into the step portion of the second annular member; and
    a flange portion having a diameter substantially the same as the diameter of the cylindrical outer circumferential surface of the second shaft is formed on an outer circumferential surface of the first shaft, and an outer circumferential surface and a side surface of the flange portion are fit into the step portion of the first annular member.

2. The pulley structure according to claim 1, wherein each of the annular members is formed so that a predetermined clearance is provided between the inner circumferential surface of the through hole of the respective annular member and the outer circumferential surface of the first shaft, after the first shaft has been inserted into a hollow portion of the second shaft on which the annular member is mounted.

3. The pulley structure according to claim 2, wherein the first annular member is mounted on the first shaft by using a spline coupling, and the second annular member is mounted on the second shaft by using a spline coupling.

4. The pulley structure according to claim 1, wherein the first annular member is mounted on the first shaft by using a spline coupling, and the second annular member is mounted on the second shaft by using a spline coupling.

5. A belt-type continuously variable transmission comprising a pulley using the pulley structure according to claim 1.

6. A belt-type continuously variable transmission comprising a pulley using the pulley structure according to claim 2.

7. A belt-type continuously variable transmission comprising a pulley using the pulley structure according to claim 3.

8. A belt-type continuously variable transmission comprising a pulley using the pulley structure according to claim 4.

* * * * *